May 9, 1950  A. O. ROBERTS  2,507,051

TRANSMISSION CONTROL

Filed June 26, 1946

A. O. ROBERTS
INVENTOR.

BY
C. C. McRae
R. G. Harris
J. R. Faulkner
T. H. Oster

ATTORNEYS.

Patented May 9, 1950

2,507,051

UNITED STATES PATENT OFFICE 2,507,051

TRANSMISSION CONTROL

Albert O. Roberts, Dearborn, Mich., assignor to Ford Motor Company, Dearborn, Mich., a corporation of Delaware Application June 26, 1946, Serial No. 679,529

3 Claims. (Cl. 192—36)

This invention relates generally to transmissions and has particular reference to transmission controls.

In certain types of transmissions, and particularly transmissions of the semi-automatic or automatic type, it is frequently necessary to employ timed shifts in effecting a transition between different operating conditions or from one speed ratio to another. In such transmissions the shifts are generally accomplished by friction bands or friction clutches arranged so as to control the operation of the transmission. These friction bands and clutches may be used, for example, to couple two rotating parts together or to lock one element of a planetary gearset against rotation, and are commonly used in transmissions both of the sliding gear and planetary types.

In shifting from one speed ratio to another it is thus often necessary to release one friction unit and to apply another, and it is essential for smooth operation that the release of the one unit and application of the other be effected simultaneously. If there is any overlapping of frictional engagement, as for example if the second friction unit is applied before the first is completely released, a smooth shift is impossible and an abrupt and uneven shift results. Likewise, if there is a lag or time interval between the release of the first friction unit and the application of the second, a lack of smoothness is inevitable. Various arrangements have heretofore been proposed to effect a timed shift to avoid these objections, but these have not been entirely satisfactory since it has been difficult to obtain the precise control necessary.

With the present invention an accurately timed shift is made possible, regardless of the state of wear of the friction units, and accordingly an extremely smooth shift is effected at all times. The transmission control effecting this precisely timed shift includes a construction utilizing fluid pressure to simultaneously release one friction unit and apply another. Although various embodiments are possible, one arrangement utilizes a hydraulic actuating unit for one of the friction units and provides for selectively directing fluid pressure to this hydraulic actuating unit to apply the friction unit and simultaneously directing the fluid pressure to the friction unit which is to be released in such a manner as to oppose and overcome its actuating unit. By providing a speed responsive governor arranged to control a hydraulic valve, the timed shift may be effected automatically when a predetermined speed has been attained. If, on the other hand, automatic operation is not desired, suitable manual controls can be provided to operate the hydraulic valve. Inasmuch as the hydraulic system is interconnected, equal pressure is applied at all points in the system, and the one friction unit will not receive sufficient pressure to be released until the hydraulic actuating means for the other friction unit has been expanded sufficiently to apply the latter. Thus, the degree of wear upon the friction units does not effect the timed shift.

Other advantages of the invention will be made more apparent as this description proceeds, particularly when considered in connection with the accompanying drawings, in which.

Figure 1:
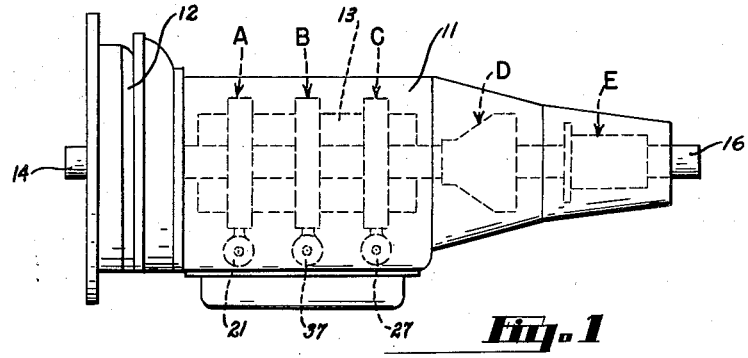
Figure 1 is a semi-diagrammatic side elevational view of a transmission embodying the present invention.

Although the present invention may be used in conjunction with various types of transmissions, for the purposes of illustration there is shown in Figure 1 a transmission housing 11 which contains a fluid coupling 12 and a multiple planetary gearset 13. Power is transmitted from the input shaft 14 through the fluid coupling and the planetary gearing to the output shaft 16.

The controls for the transmission include a lockup band A, a forward speed band B, a reverse band C, a high speed clutch D and a governor valve E. The bands A, B and C are of the external contracting type and are arranged to lock certain elements of the multiple planetary gearset 13 against rotation to effect speed changes.

Figure 2:
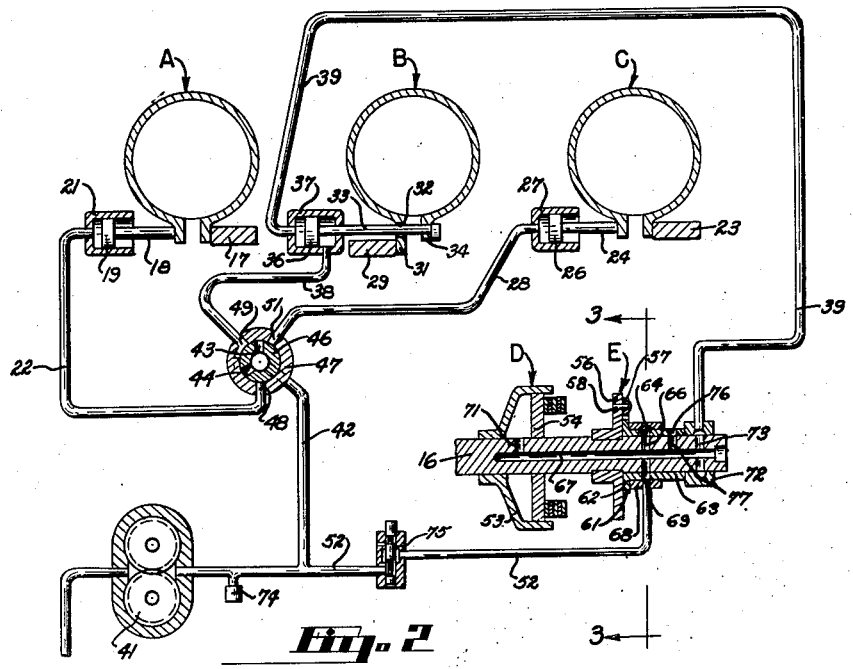
Figure 2 is a diagram partly in section illustrating the timed interval.

With particular reference to Figure 2, it will be noted that one end of the lockup band A engages an anchor 17 while the opposite end is actuated by a piston rod 18 extending from a piston 19, the latter being reciprocably mounted within the cylinder 21. Fluid under pressure is supplied to the cylinder 21 through a conduit 22 to actuate the piston 19 and clamp the band A into frictional engagement with its drum.

The actuating means for the reverse band C is identical with that of the lockup band A and comprises an anchor 23, piston rod 24, piston 26, cylinder 27, and conduit 28.

The actuating means for the forward speed band B is somewhat different, and comprises an anchor 29 engaging the end 31 of the band, the latter being provided with an aperture 32 through which extends the piston rod 33. The end of the piston rod is connected to the opposite end 34 of the band and is actuated by a piston 36 reciprocable within the cylinder 37. Conduits 38 and 39 communicate with the cylinder 37 on opposite sides of the piston 36. It will be apparent that when fluid pressure is supplied through conduit 38 the piston is moved to the left to contract the band into frictional engagement with its drum, and that when pressure is supplied through the conduit 39 the piston is moved to the right to release the band.

A suitable pump 41, which may be driven either by the input or the output shaft of the transmission or from a separate power source, delivers fluid under pressure from a sump (not shown) to a supply conduit 42. The supply conduit 42 communicates with a pair of radial ports 43 and 44 in the rotatable barrel 46 of the manually operated valve 47, the latter being provided with ports 48, 49 and 51 communicating respectively with the conduits 22, 38 and 28. The barrel of the valve is shown in its neutral position in which there is no communication between the ports of the barrel and the ports of the valve. To selectively admit fluid pressure to the conduits 22, 38 and 28, rotation of the barrel 46 in a clockwise direction by suitable manual controls, such as a steering column lever, establishes communication between ports 43 and 51 and supplies fluid pressure through conduit 28 to the cylinder 27 to apply the reverse band C. Rotation of the valve barrel 46 in a counterclockwise direction from the neutral position shown in Figure 2 establishes communication between the ports 43 and 49 to supply fluid pressure through the conduit 38 to cylinder 37 to apply the forward speed band B. Further rotation of the valve barrel in a counterclockwise direction aligns ports 44 and 48 to supply fluid pressure through conduit 22 to cylinder 21 to actuate the lockup band A. It will be noted that the port 49 is elongated so that communication between ports 43 and 49 is maintained when the valve barrel has been rotated to align ports 44 and 48. In the latter position the transmission is locked in a low speed ratio for downhill operation and the like.

The pump 41 also supplies fluid under pressure to a supply conduit 52 to furnish fluid pressure to the high speed clutch D and to the conduit 39 under the control of the governor valve E. The high speed clutch D is of the friction type, and is concentric with the output shaft 16 of the transmission. A cylinder 53, which is concentric with the output shaft, carries a piston 54 which engages the high speed clutch to apply the latter.

Figure 3:
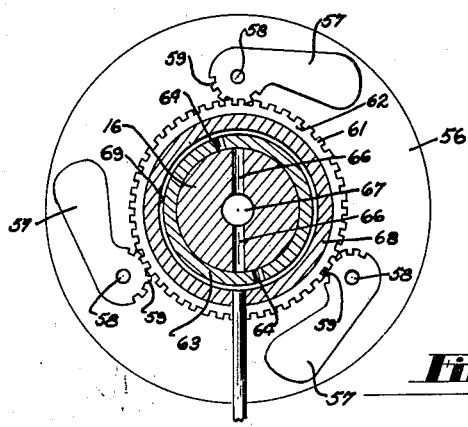
Figure 3 is an enlarged transverse cross-sectional view taken substantially on the plane indicated by the line 3—3 of Figure 2.

The governor valve E includes a collar 56 keyed to the output shaft 16 and supporting a plurality of centrifugal weights 57, each pivotally connected to the collar by a pivot pin 58. It will be seen from an examination of Figure 3 that each centrifugal weight 57 is pivotally mounted near one end and is formed with an arcuate series of gear teeth 59 concentric with the pivot pin 58. The teeth on the centrifugal weights mesh with the teeth 61 formed on the periphery of the flange 62 of a sleeve 63 which is rotatably mounted upon the shaft 16. The sleeve 63 is provided with a pair of diametrically opposite ports 64 which are adapted in one relative angular position of the sleeve and shaft to communicate with passageways 66 extending diametrically through the shaft 16 and communicating with the central bore 67 of the shaft. Suitable spring means (not shown) normally hold the centrifugal weights in the position shown in Figure 3 in which the ports 64 do not communicate with the passages 66. It will be apparent, however, that upon rotation of the output shaft 16 and the collar 56, the extended ends of the centrifugal weights 57 are thrown radially outwardly effecting a rotation of the sleeve 63 relative to the shaft by reason of the engagement between teeth 59 and 61. The parts are so designed that upon reaching a predetermined speed the sleeve is rotated to a position establishing communication between ports 64 and the passageways 66.

Fluid under pressure from the supply conduit 52 is continually supplied to the ports 64 by means of a collector ring 68 provided with an internal annular groove 69. The central bore 67 of the output shaft communicates through a radial port 71 to the interior of the cylinder 53.

It will now be apparent that when the output shaft 16 of the transmission reaches the predetermined speed, fluid under pressure will be supplied through conduit 52, annular groove 69, ports 64, passageways 66, bore 67, and port 71 to the cylinder 53 of the high speed clutch to apply the latter. At the same time fluid pressure is supplied to the conduit 39 which leads to the cylinder 37 for the forward speed band B since the conduit 39 is always in communication with the central bore 67 of the shaft through the collector ring 72 and the radial passages 73 in the shaft.

The hydraulic system also includes a relief valve 74 to govern the fluid pressure supplied by the pump, and a kickdown valve 75 located in the supply conduit 52 and adapted to be operated by complete depression of the accelerator pedal to block the conduit 52 and release the high speed clutch, thereby causing the transmission to shift to a lower speed ratio. The governor valve E is also provided with an exhaust port 76 formed in the sleeve 63 in such position as to be in alignment with a radial passage 77 in the shaft at speeds below the predetermined governor speed. Passage 77 communicates with the central bore 67 and thus provides an exhaust for both the high speed clutch D and the conduit 39. At speeds the predetermined governor speed, however, the rotation of sleeve 63 moves port 76 out of alignment with passage 77 and closes the exhaust.

*Operation*

In normal forward speed operation the manually operated control lever is shifted to the forward speed position to rotate the valve barrel 46 in a counterclockwise direction to establish communication between the pressurized passage 43 and conduit 38, actuating piston 36 to apply the forward speed band B and placing the transmission in a low speed ratio in the forward direction. In order to effect a transition from this low speed ratio to a higher speed ratio it is necessary to release the forward speed band B and apply the high speed clutch D. To eliminate the possibility of abrupt and rough operation and to secure a smooth quiet shift, it is essential that the shift be timed so that band B is disengaged simultaneously with the engagement of clutch D. This is accomplished by the governor valve E which functions when the output shaft of the transmission reaches a certain predetermined speed to admit fluid pressure from the supply conduit 52 to the bore 67 of the shaft. Inasmuch as the bore 67 communicates both with the radial passage 71 and the conduit 39, fluid pressure is simultaneously applied to cylinders 53 and 37 for the high speed clutch D and the forward speed band B respectively. The pressure in cylinder 53 applies the high speed clutch D while the pressure in the cylinder 37 is effective to release the forward speed band B. The release of band B is effected by the pressure in conduit 39 in opposition to the pressure in the cylinder 37 on the opposite side of the piston since the effective area of the back of the piston 36 is greater than the front of the piston due to the area of the piston rod 33. Thus, although the pressure on opposite sides of the piston is equal, the latter will be moved to the right to release the forward speed band B. Inasmuch as pressure is simultaneously admitted to the cylinder 53 and to the cylinder 37 in back of the piston 36, the application of clutch D takes place simultaneously with the release of band B. Furtherfore, since the pressure in the portion of the system controlled by the governor valve E does not build up to its full value until the piston 54 has moved sufficiently to apply the high speed clutch D, it will be seen that the forward speed band B is not released until the clutch is applied regardless of the amount of wear of the friction facings of the latter. A precisely timed shift is thus effected at all times.

In similar fashion, the shift from the high speed ratio to the low speed ratio when the vehicle is decelerating is accomplished smoothly. When the speed of the output shaft 16 is reduced below the predetermined governor speed, the centrifugal forces upon the governor weights 57 is insufficient to hold them outwardly, and they return to the position shown in Figure 3 in which the sleeve 63 has been rotated so that ports 64 are out of alignment with passage 66. The supply of fluid pressure to the central bore 67 of the shaft is thus cut off, and the bore is placed in communication with the exhaust port 76 through the radial passage 77. This simultaneously releases the pressure in the high speed clutch cylinder 53 and in the forward speed cylinder 37 in back of the piston, so that the pressure in cylinder 37 in front of the piston is again effective to apply the band.

The invention is thus effective to provide a smooth, accurately timed shift both when accelerating and when decelerating, and is readily adapted to be used with various types of transmissions utilizing friction means for effecting operational changes. In addition, the control can be arranged to be operated either automatically by a speed responsive governor valve.

It will be understood that the invention is not to be limited to the exact construction shown and described, but that various changes and modifications may be made without departing from the spirit and scope of the invention, as defined in the appended claims.

What is claimed is:

1. In a transmission having a pair of friction means adapted to be operated alternatively to control the transmission, hydraulic actuating means for each of said friction means, a fluid pump for supplying fluid under pressure to each of said hydraulic actuating means, a hydraulic valve on the output shaft of said transmission for directing fluid under pressure to the hydraulic actuating means for one of said friction means to apply the latter and simultaneously directing fluid under pressure to the hydraulic actuating means for the other of said friction means to release the latter, said valve comprising a grooved collector ring in constant communication with said pump, an oscillatable sleeve provided with a radial port, passageways in said transmission shaft communicating with the port in said sleeve in one angular position of the sleeve and leading to the hydraulic actuating means for one of said friction means, and a centrifugal governor carried by said shaft adapted to rotate said sleeve relative to said shaft and to align said port and said passageway when a predetermined speed has been attained.

2. In a transmission having a pair of friction means adapted to be operated alternatively to control the transmission, hydraulic actuating means for each of said friction means, a fluid pump for supplying fluid under pressure to each of said hydraulic actuating means, a hydraulic valve on the output shaft of said transmission for simultaneously controlling the fluid pressure for applying the hydraulic actuating means for one of said friction means and releasing the hydraulic actuating means for the other of said friction means, said valve comprising an oscillatable ported sleeve concentric with the axis of said output shaft and having a series of concentric teeth formed thereon, a supporting member mounted upon said output shaft and rotatable therewith, and a plurality of angularly spaced weighted elements pivotally mounted upon said supporting member and carrying teeth engageable with the teeth upon said oscillatable sleeve to rotate the latter relative to said output shaft as the speed of said output shaft varies.

3. In a transmission, first friction means adapted to control the transmission, a hydraulic cylinder, a piston within said cylinder having a piston rod operatively connected to said friction means, a fluid pump, a conduit from said fluid pump to said cylinder to normally actuate said piston to apply said friction means, second friction means concentric with the output shaft of said transmission for controlling the transmission, hydraulic means for applying said second friction means including a hydraulic chamber surrounding said output shaft, an axially extending passage within said output shaft and communicating with said chamber, a conduit interconnecting said axially extending passage with said hydraulic cylinder on the opposite side of said piston from said piston rod, an oscillatable sleeve concentrically mounted upon said output shaft, a conduit connecting said sleeve to said pump, said oscillatable sleeve being provided with a port communicating with the axially extending passage in said output shaft in one relative angular position of said sleeve and shaft, and a centrifugal governor adapted to rotate said sleeve relative to said shaft to interconnect said port and said passage when a predetermined speed has been attained to supply fluid under pressure to said hydraulic chamber to apply said second friction means and to simultaneously apply fluid under pressure to said hydraulic cylinder at the rearward side of said piston to release said first friction means.

ALBERT O. ROBERTS.

REFERENCES CITED

The following references are of record in the file of this patent:

UNITED STATES PATENTS

| Number | Name | Date |
| --- | --- | --- |
| 1,619,701 | Charlton | Mar. 1, 1927 |
| 1,619,703 | Charlton | Mar. 1, 1927 |
| 2,119,431 | Gommel | May 31, 1938 |
| 2,319,549 | Lawrence | May 18, 1943 |